(12) United States Patent
Ravaud et al.

(10) Patent No.: US 11,387,028 B2
(45) Date of Patent: Jul. 12, 2022

(54) UNITARY MAGNET HAVING RECESSED SHAPES FOR FORMING PART OF CONTACT AREAS BETWEEN ADJACENT MAGNETS

(71) Applicant: Whylot SAS, Cambes (FR)

(72) Inventors: Romain Ravaud, Labastide-Murat (FR); Loic Mayeur, Saint Santin (FR); Vasile Mihaila, Figeac (FR)

(73) Assignee: Whylot SAS, Cambes (FR)

( * ) Notice: Subject to any disclaimer, the term of this patent is extended or adjusted under 35 U.S.C. 154(b) by 168 days.

(21) Appl. No.: 16/769,182

(22) PCT Filed: Jan. 18, 2019

(86) PCT No.: PCT/IB2019/050424
§ 371 (c)(1),
(2) Date: Jun. 2, 2020

(87) PCT Pub. No.: WO2019/145832
PCT Pub. Date: Aug. 1, 2019

(65) Prior Publication Data
US 2021/0218300 A1   Jul. 15, 2021

(30) Foreign Application Priority Data
Jan. 26, 2018   (FR) ...................................... 1800085

(51) Int. Cl.
*H01F 7/02*   (2006.01)
*H02K 1/278*   (2022.01)
*H02K 1/28*   (2006.01)

(52) U.S. Cl.
CPC ............. *H01F 7/021* (2013.01); *H02K 1/278* (2013.01); *H02K 1/28* (2013.01)

(58) Field of Classification Search
CPC ...... H02K 41/031; H02K 1/02; H02K 1/2793; H02K 21/24; H02K 1/278; H02K 1/28;
(Continued)

(56) References Cited

U.S. PATENT DOCUMENTS

| 4,555,685 A | 11/1985 | Maruyama |
| 2004/0263012 A1 | 12/2004 | Dommsch et al. |

(Continued)

FOREIGN PATENT DOCUMENTS

| CN | 101162638 | 4/2008 |
| DE | 102008055893 | 5/2010 |

(Continued)

OTHER PUBLICATIONS

International Search Report dated Apr. 24, 2019 from IA PCT/IB2019/050424.

*Primary Examiner* — Mohamad A Musleh
(74) *Attorney, Agent, or Firm* — Crockett & Crockett, PC; K. David Crockett, Esq.

(57) ABSTRACT

A unitary magnet (1) that has an elongate shape including a first longitudinal portion (1a) having an outer contour with shapes (6) that are recessed in the direction of the inside of the unitary magnet (1), where the recessed shapes (6) extend over at least part of a length of the first portion (1a) and/or extending, over at least part of the perimeter of the unitary magnet, (1) transversely to a longitudinal axis of the unitary magnet near at least one longitudinal end of the unitary magnet (1).

21 Claims, 2 Drawing Sheets

(58) Field of Classification Search
CPC ........ H01F 7/021; H01F 41/0253; H01F 7/02; H01F 7/0221; H01F 7/0231
See application file for complete search history.

(56) References Cited

U.S. PATENT DOCUMENTS

2011/0080065 A1    4/2011    Watanabe et al.
2013/0181565 A1*   7/2013    Petro .................... H02K 15/022
                                                                              310/156.33

FOREIGN PATENT DOCUMENTS

| EP | 2306619 A2 * | 4/2011 | ........... H01F 1/0536 |
| EP | 3125405 A1 * | 2/2017 | ........... G01R 33/383 |
| FR | 3086465 A1 * | 3/2020 | ............... H02K 1/02 |
| WO | WO-2012141932 A2 * | 10/2012 | ........... H01F 7/0205 |

* cited by examiner

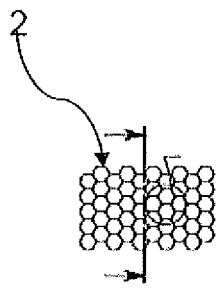 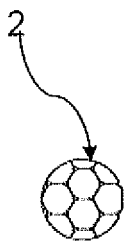 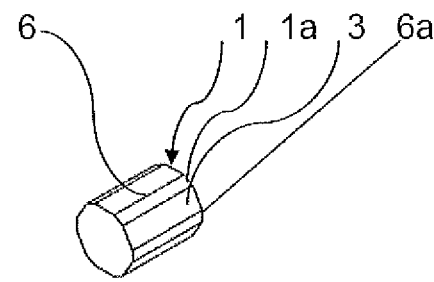
FIG.1a  FIG.1b  FIG.1c
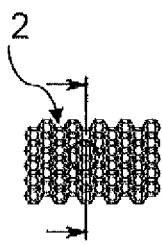  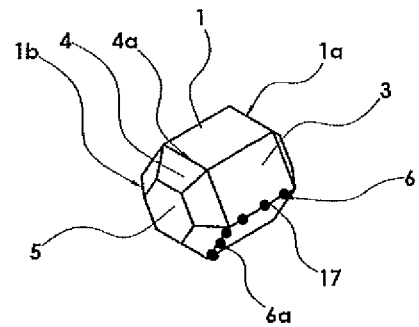
FIG.2a  FIG.2b  FIG.2c
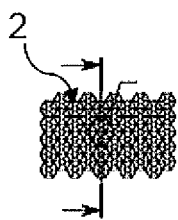  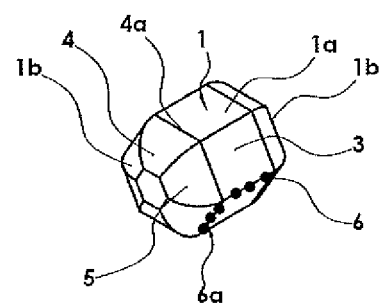
FIG.3a  FIG.3b  FIG.3c

UNITARY MAGNET HAVING RECESSED SHAPES FOR FORMING PART OF CONTACT AREAS BETWEEN ADJACENT MAGNETS

FIELD OF THE INVENTIONS

The present invention relates to a unitary magnet having recessed shapes to form part of contact areas between adjacent unitary magnets and a magnet structure consisting of a plurality of adjacent unitary magnets. The invention further relates to an electromagnetic actuator comprising one or more such magnet structures.

BACKGROUND

The present invention has an advantageous but not restrictive application in an electromagnetic actuator that outputs high power with a high speed of rotation of the rotor, which is achieved by the use of one or more magnet structures according to the present invention. An electromagnetic actuator of this type can be used, for example, in a fully electric or hybrid automotive vehicle.

Advantageously but not restrictively, the actuator can be a rotary actuator that can comprise at least one rotor framed by two stators, whereby these elements can be superimposed on one another and can be separated by at least one air gap on the same shaft.

In high-speed applications is necessary to have not only a compact system made possible by the reduction of the weight and size of the electromagnetic actuator for an optimal output but also very high mechanical strength of the part in rotation or translation, i.e. the rotor or the elements in linear translation, to improve the reliability of the system.

In high-speed applications, it is necessary to reduce losses to achieve an optimal output. Miniaturization is an increasingly sought-after objective in automobile applications. To achieve that, it is important to have a compact system made possible by the reduction of the weight and size of the actuator as well as very high mechanical strength of the moving part to improve the reliability of the system.

For an electromagnetic actuator with axial flux, as a nonrestrictive example of the present invention, the rotor comprises a body in the form of a disk having two circular faces connected by a thickness, the disc being delimited between an external rim and an internal periphery that forms the boundary of a cavity for a rotating shaft.

At least two permanent magnets are applied against at least one of the two circular faces of the body called the support face. For a rotor with a single air gap designed to be associated with a stator, a single circular face of the body carries the magnets while, for a rotor with two air gaps with a respective stator, it is the two faces that carry the magnets.

The magnets are each held on the face or on their respective face by retention means, a space being left between the at least two magnets on the same face.

For an electromagnetic actuator with radial flux, the rotor comprises a cylindrical body, the entire periphery of which carries magnets.

Each stator or each of the stators has winding elements comprising a tooth with a winding, the tooth being framed on each of its sides by a notch, a metallic wire made of a highly conductive material being wound around the tooth to form a winding.

When electricity is fed to the series or series of windings, the rotor which is fastened to the output shaft of the motor is subjected to a torque resulting from the magnetic field, the magnetic flux created being an axial flux for an axial flux electromagnetic machine and a radial flux for a radial flux machine.

It is known that magnets can be demagnetized when they are subjected to high temperatures.

US-A-2011/080065 describes a rotor for an axial flux motor with a plurality of magnets structures arranged around the rotor and composed of a plurality of unitary magnets.

The rotor described in this document is based on the finding that the permanent magnets in the motor of this type are exposed to a high temperature on account of the heat generated by the windings and have a non-negligible probability of demagnetization by the demagnetizing field of the windings. Thus there is a demand for magnets in which the coercive force, which is an index of high-temperature strength and resistance to demagnetization, is above a certain level.

When the rotor rotates, Foucault currents circulate in the magnets. Effective means to reduce the Foucault currents consist of dividing a magnetic body to interrupt the path of the Foucault current. Although the division of a magnet body into smaller pieces leads to a greater reduction of losses resulting from Foucault currents, it becomes necessary to take into consideration problems such as an increase in the cost of manufacture and a decrease in output.

This prior art document teaches that each of the divided unitary magnets has a coercive force close to the surface of the magnet part that is greater than the coercive force in the interior of the unitary magnet. This is a difficult and expensive measure to implement.

Moreover, in this prior art document the unitary magnets are adhesively attached face to face because they are in the shape of cubes, which contributes to their demagnetization and does not allow an exchange of heat with the exterior of the magnets. It has therefore been shown that such an arrangement of unitary magnets in the shape of cubes adhesively fastened to one another does not reinforce the strength of a magnet structure composed of such unitary magnets.

This prior art document even provides the arrangement of the unitary magnets in a mesh structure to form a magnet structure, but that requires additional work to position the magnets and a loss of space due to the meshes between the magnets, as a result of which the magnet structure contains fewer unitary magnets and therefore has less magnetic power.

U.S. Pat. No. 4,555,685 relates to large magnets. These large magnets have a trapezoidal shape but they are not connected to one another to form a compact magnet structure.

US-A-2004/263012 describes large magnets that are therefore similar to magnet structures. These large magnets have beveled edges but they are not combined with one another to form a compact magnet structure.

SUMMARY

The problem addressed by the present invention is to design a form of unitary magnet and a magnet structure combining a plurality of unitary magnets that can counteract the demagnetization of the unitary magnet while allowing a strong fastening of unitary magnets among one another when these unitary magnets form the magnetic structure that can withstand high speeds of operation while supplying a powerful magnetic field with an optimal retention of the magnets in their support without the interposition of separation elements between the unitary magnets.

For this purpose the present invention relates to a magnet structure in three dimensions constituted by a plurality of unitary magnets, the unitary magnets being directly adjacent to one another, characterized in that each unitary magnet comprises a first longitudinal portion that has an external contour having recessed shapes, the shapes being recessed toward the interior of the magnet, extending over at least a portion of the length of the first portion and/or recessed shapes that extend over at least a portion of the periphery of the unitary magnet transversally to a longitudinal axis of the unitary magnet in proximity to at least one longitudinal extremity of the unitary magnet, the unitary magnets being in partial contact with one another at the level of the shapes recessed toward the interior, the magnets being adhesively fastened to one another by the application of adhesive over at least a portion of the recessed shapes, the plurality of unitary magnets resulting in a mesh structure of magnets without the interposition of retention elements among them other than the adhesive.

"In proximity to the longitudinal extremity" means that the transversely recessed shapes are between one longitudinal extremity of the unitary magnet and no farther than a point equidistant from the longitudinal extremity of the unitary magnet and the center of the length of the first portion of the unitary magnet.

These longitudinally and/or transversely recessed shapes are placed in areas designed to ensure contact between the adjacent magnets. According to the present invention, no attempt is made to adhesively connect the unitary magnets face to face but only locally on the shapes recessed into each unitary magnet which therefore contain the adhesive, advantageously in the form of resin. These contact areas can be spots, linear or in the form of a circular arc along the exterior contour of the unitary magnets. It is the adhesive contained in these recessed shapes that creates the adhesion between two adjacent unitary magnets.

Unitary magnets are thus obtained in the form of "crystals" associated with one another which are not connected over the entire surface area of the facets or longitudinal surfaces, although coatings of resin and adhesive are substituted, for example, on at least one longitudinal extremity because there is no second portion on this longitudinal extremity, or on the large base of the facets inclined, for example, at 45° and/or on the longitudinal facets advantageously provided with beveled edges to construct a mesh network on the extremities of the poly-faceted blocks with limited areas of contact between magnets.

For unitary magnets with a perfect ovoid shape with a rounded first portion, the contact between two adjacent unitary magnets is smaller and can be contact only in spots, and corresponds essentially to a small circular arc between two unitary magnets. A strip the size of the contact circular arc between two adjacent unitary magnets can be hollowed out to receive the adhesive, which is advantageously in the form of resin.

The recessed shapes are advantageously cavities or longitudinal and/or transverse bevels on the unitary magnet hollowed out in the exterior contour of the first portion of the unitary magnet. These cavities or bevels filled with adhesive are designed to form the areas of contact between two adjacent unitary magnets. One unitary magnet can be associated with multiple adjacent magnets.

The first portion and the longitudinal bevels advantageously extend over the enter length of each unitary magnet.

The first portion forming the body of each unitary magnet is advantageously in the shape of a polygon having longitudinal facets or a cylindrical shape having a circular or ovalized cross-section.

Advantageously, when the first portion is in the shape of a polygon having longitudinal facets, each bevel separates two longitudinal facets of the first portion. For a polygon shape, the longitudinal edges are preferably the part that has the longitudinal bevels.

Each bevel advantageously has a depth that varies over the length of each unitary magnet. This makes it possible to have a thickness of adhesive that is not constant over the entire length of the bevel.

Each unitary magnet advantageously has at least one second portion on one longitudinal extremity of the unitary magnet as an extension of the first portion, this at least one second portion pointing toward an associated longitudinal extremity of the magnet and having a decreasing cross section as it approaches the longitudinal extremity.

Considering a unitary magnet as an elementary element in the form of a block, the ideal shape of this block is a symmetrical ellipsoid of revolution, also called an ovoid shape, approximately a flattened sphere, which on account of its topology is difficult to demagnetize because its magnetic field relative to the magnetization is shapeless. There is no rotating field in the corners. Based on this discovery, the inventive step of the present invention is to constitute a mesh structure of unitary magnets that approximates as closely as possible an ellipsoid of revolution.

Several embodiments are possible and the ovoid shape of the unitary magnet can be more or less perfect, having an end portion with a convex rounded shape on one or both longitudinal extremities.

A relatively perfect ovoid shape with two longitudinal extremities in a convex shape is optimal but difficult to obtain by machining. On the other hand, it is the ideal shape to counteract a demagnetization of the unitary magnet.

As an alternative, a unitary magnet based on a poly-faceted structure with a first portion called the body with longitudinal facets and at least one end portion with facets inclined at angles of between 0 and 45° can also be considered, making it possible to increase the magnetic field relative to the magnetization while preserving the large active surfaces on the extremities of the unitary magnets in the form of blocks.

Between these two embodiments, numerous other shapes more or less that approximate an ovoid shape are also possible.

Each unitary magnet advantageously has an at least partly ovoid external contour with the first portion forming the body of the unitary magnet having a larger cross section and extending over a longer length of the unitary magnet than the at least one second portion.

The result is a unitary magnet with an ovoid shape resistant to the demagnetization of the magnet. However, a unitary magnet of this type is more difficult to machine than a unitary magnet in the shape of a polygon with at least one rounded longitudinal extremity with a convex shape to more closely approximate an ovoid shape.

Advantageously, the at least one second longitudinal end portion is rounded into a convex shape, a crown of the convex shape forming the associated longitudinal extremity of each unitary magnet. This makes it possible to achieve a shape that approximates an ovoid shape at least on one longitudinal extremity.

The at least one second longitudinal end portion advantageously ends on its associated longitudinal extremity in a median facet that forms the longitudinal extremity. The longitudinal extremity is then truncated and relatively flat.

The at least one second longitudinal end portion advantageously comprises lateral facets inclined toward a longitudinal axis of the magnet approaching the associated longitudinal extremity of the magnet, the inclined lateral facets extending between a large base connected to the first portion forming the body of the magnet and a small base forming a longitudinal extremity of the magnet. This embodiment is easier to achieve than a perfect ovoid shape The inclined lateral facets are rounded and convex. This makes it possible to approximate the embodiment that has facets with an ovoid shape.

The inclined lateral facets of the at least one second portion have the same width as the longitudinal facets of the first portion, one inclined facet being placed end to end with a respective longitudinal facet. The inclined lateral facets then extend the longitudinal facets.

The large base of each inclined facet is advantageously beveled at least partly by a transverse bevel in the form of a recess.

Each longitudinal extremity of each magnet advantageously comprises a second longitudinal end portion. The ovoid shape is then guaranteed on both longitudinal extremities of the unitary magnet.

When the longitudinal and/or transvers recessed shapes are longitudinal and/or transverse bevels on the unitary magnet into the external contour of the magnet, the deposition of adhesive relates exclusively to the longitudinal and/or transverse bevels of the unitary magnets.

Because the large base of each inclined facet is at least partly hollowed out by a transverse bevel in the form of a transverse recess on the at least one second portion, the application of the adhesive relates exclusively to the large bases of the unitary magnets for the at least one second portion.

The invention further relates to a linear or rotary electromagnetic actuator, characterized in that it comprises a magnet structure of the type described above or a plurality of such magnet structures, the magnet structure or structures forming part of a rotor that rotates around its center, the magnet structure or structures being arranged concentrically with respect to the center of the rotor.

When unitary, the magnet structure advantageously forms a single magnet extending over the actuator or, when there are multiple magnets, the magnet structures are successive blocks forming successive alternating magnetic poles.

The invention relates to a method for the fabrication of a magnet structure of the type described above, characterized in that it comprises the following steps:
  cutting out from a magnetized tile having a length, a width and a thickness forming three dimensions of the tile a plurality of unitary magnets according to the three dimensions of the magnetized tile,
  determination of partial contact areas on each unitary magnet with each magnet that is adjacent to it when the magnets are arranged next to one another,
  creation in the areas of contact of shapes recessed toward the interior of the unitary magnet extending over at least part of the length of the first portion and/or transverse to the first portion,
  adhesive connection of each unitary magnet by the application of a resin for each unitary magnet only in determined partial contact areas,
  positioning of the unitary magnets thus adhesively connected adjacent to one another, a partial contact between two adjacent unitary magnets being established in the contact areas.

The method on which the present invention is based is therefore that the cohesiveness among the unitary magnets is achieved without the need for a mesh structure in which the unitary magnets are individually housed, which represents a saving of space and makes it possible to house more unitary magnets in each magnet structure.

Moreover, there is no longer any face-to-face contact of the unitary magnets as proposed by the prior art, but an essentially spot contact, linear contact or contact in the form of a circular arc which makes it possible to increase the magnetic field relative to the magnetization and eliminate the need to dope the magnets while preventing elementary Foucault currents. It is therefore possible to assemble a very large total number of unitary magnets into a magnet structure, for example on the order of 200 to 300 unitary magnets per magnet structure, compared to a maximum of twenty in a magnet structure of the prior art.

Ultimately, it is possible to consider unitary magnets adopting different configurations tending more or less toward a perfect ovoid shape.

Advantageously, there is an injection of a coating of composite around the unitary magnets thus placed in contact and adhesively connected for their coating. This makes it possible to obtain a compact magnet structure while filling in the spaces between the unitary magnets.

BRIEF DESCRIPTION OF THE DRAWINGS

Other characteristics, objectives and advantages of the present invention are described in greater detail below and with reference to the accompanying drawings which illustrate nonrestrictive embodiments, and in which:

FIGS. 1a, 1b and 1c are respectively schematic illustrations of a head-on view of a magnet structure containing a plurality of unitary magnets, an enlarged view of this magnet structure and a view in perspective of unitary magnets in the form of an elongated block in the shape of a polygon according to a first embodiment of the present invention, FIGS. 2a, 2b and 2c are respectively schematic illustrations of a head-on view of a magnet structure containing a plurality of unitary magnets, an enlarged view of this magnet structure and a view in perspective of a unitary magnet in the form of an elongated block according to a second embodiment of the present invention, the unitary magnet comprising at least one longitudinal end portion in an ovoid shape with inclined facets, FIGS. 3a, 3b and 3c are schematic representations respectively of a head-on view of a magnet structure containing a plurality of unitary magnets, an enlarged view of this magnet structure and a view in perspective of a unitary magnet in the form of an elongated block according to a third embodiment of the present invention, the unitary magnet comprising at least one longitudinal end portion with an ovoid shape with inclined facets, the inclined facets being rounded.

Figure 4A:
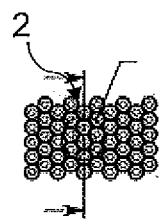
FIGS. 4a, 4b and 4c are schematic representations respectively of a head-on view of a magnet structure containing a plurality of unitary magnets, an enlarged view of this magnet structure and a view in perspective of a unitary magnet in the form of an elongated block according to a fourth embodiment of the present invention, the unitary magnet having an essentially perfect ovoid shape with two rounded longitudinal end portions.
Figure 4B:
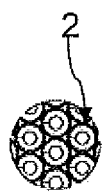

The figures are given by way of examples and are not restrictive of the invention. They constitute schematic illustrations intended to facilitate an understanding of the invention and are not necessarily drawings to scale of practical applications. In particular, the dimensions of the different parts are not representative of reality.

In the following, although reference will be made to a single unitary magnet, a single magnet structure, a single longitudinal facet, a single inclined facet and a single bevel for each type of bevel, it must be understood that what is said with regard to one of these referenced elements is applicable to all similar elements.

To be transverse to the unitary magnet means to be in a plane perpendicular to a longitudinal axis of the elongated unitary magnet having the form of a block.

DETAILED DESCRIPTION OF THE INVENTIONS

With reference to all the figures and to FIGS. 1a to 1c, 2a to 2c and 3a to 3c in particular, the present invention relates to a unitary magnet 1 with an elongated shape that can be considered a block because its length is significantly greater than its width.

The unitary magnet 1 has a first longitudinal portion 1a having an external contour with shapes 6 recessed toward the interior of the unitary magnet 1, extending over at least a portion of a length of the first portion 1a as well as shapes 6a recessed toward the interior of the unitary magnet 1 extending over at least a portion of the contour of the unitary magnet transverse to a longitudinal axis of the unitary magnet 1.

In FIGS. 2c and 3c, the recessed shapes are drawn as points with a single point identified as 6 or 6a on each edge 17, which is not restrictive, the recessed shapes being preferably bevels or grooves hollowed out from the interior of a respective edge 17.

The recessed shapes 6, 6a can be a bevel or a groove that extends along the length of an edge 17 of a facet when the unitary magnet has a polygon shape over at least a portion of this length. These recessed shapes 6, 6 can be cavities separated from each other along the length of an edge of a facet or bevels forming a discontinuous set of bevels spaced apart over the length of an edge. The depth of the recessed shapes 6, 6a is sufficient to retain the adhesive in their interior.

The unitary magnet 1 can also have at least one second longitudinal portion 1b extending the first longitudinal portion 1a toward one longitudinal extremity of the unitary magnet 1 and transverse recessed shapes 6a can be provided on this or these second longitudinal portions 1b as an alternative or in addition to the longitudinal recessed shapes 6 of the first portion 1a, advantageously at the junction of the first 1a and second portions 1b.

As shown in FIG. 1c, the transverse recessed shapes 6 a can also be present on the first portion 1a when the unitary magnet 1 does not have a second portion 1b, this on the longitudinal extremities of the unitary magnet 1.

Therefore, when there is no second portion 1b, the recessed shapes can extend over at least part of the periphery of the unitary magnet 1 transverse to a longitudinal axis of the unitary magnet just to the longitudinal extremity of the unitary magnet 1, as can be the case in FIG. 1c.

These recessed shapes 6, 6a can be longitudinal bevels 6 and or transverse bevels 6a on the unitary magnet 1 hollowed out into the external contour of the first portion 1a of the unitary magnet 1, whereby the transverse recessed shapes 6a can be located at the junction of the first portion 1a and the second portion 1b.

In FIG. 1c, the unitary magnet comprises a single first portion 1a without a second end portion 1b. The first portion 1a is in the shape of a polygon with longitudinal facets 3. The longitudinal recessed shapes 6, advantageously bevels 6, can be hollowed out from the longitudinal edges 17 between two longitudinal facets 3 and the transversal recessed shapes 6a can be hollowed out on at least one of the two longitudinal extremities of the unitary magnet 1.

It follows that the first portion 1a and the longitudinal bevels 6 can extend over the entire length of the magnet. Each longitudinal bevel 6 can therefore separate two longitudinal facets 3 of the first portion 1a.

In FIG. 2c, the unit magnet 1 comprises a single second end portion 1b. The first portion 1a and second portion 1b of the unitary magnet 1 each comprise facets, longitudinal facets 3 for the first portion 1a and facets 4 inclined toward the longitudinal extremity associated with the second portion 1b.

The longitudinal recessed shapes 6, which are advantageously longitudinal bevels 6, can be hollowed out from the longitudinal edges 17 between two longitudinal facets 3 of the first portion 1a and/or the transverse recessed shapes 6a, advantageously transversal bevels 6a, can be hollowed out from a large base 4a of the inclined facets 4 of the second portion 1b extending from the large base 4a toward a small base forming the associated longitudinal extremity of the unitary magnet 1.

In FIG. 3c, the unitary magnet 1 comprises two second end portions 1b respectively for each longitudinal extremity of the unitary magnet 1. The first 1a and second portions 1b of the unitary magnet 1 each comprise facets, longitudinal facets 3 for the first portion 1a and facets 4 inclined toward the longitudinal extremity associated with the respective second portion 1b. In this embodiment, the inclined facets 4 are rounded.

The longitudinal recessed shapes 6, advantageously longitudinal bevels 6, can be hollowed out from the longitudinal edges 17 between two longitudinal facets 3 of the first portion 1a and/or the transverse recessed shapes 6a, advantageously transverse bevels 6a, can be hollowed out on a large base 4a of the inclined facets 4 of the second portion 1b.

Figure 4C:
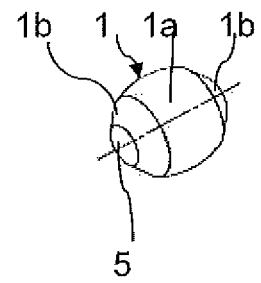
Figure 5:
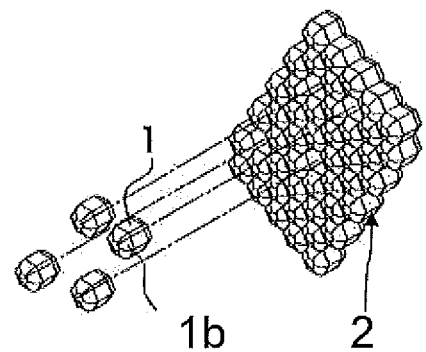
FIG. 5 is a schematic illustration of a view in perspective of a magnet structure according to the present invention containing unitary magnets according to the second embodiment, unitary magnets being shown separately from the magnet structure to make them easier to see.

In FIG. 4c, the unit magnet 1 has an almost perfect ovoid shape with a first portion 1a and two second rounded end portions 1b with a convex shape. The contact between two adjacent and ovoid unitary magnets 1 is essentially spot contact or extends along a limited circular arc.

In this case, the unitary magnet 1 can have an at least partly ovoid exterior contour with the first portion 1a forming the body of the unitary magnet 1 having a larger cross-section and extending over a greater length of the unitary magnet 1 than the at least one second portion 1b, as show in in FIG. 4c which includes two second portions 1b, one of which on each of the two longitudinal extremities of the unitary magnet 1.

The recessed shapes, advantageously bevels, can be hollowed out in the reduced contact area between two adjacent ovoid unitary magnets 1 and be in the form of a circular arc.

In FIGS. 2c and 3c, the transverse recessed shapes 6a that extend over at least a portion of the contour of the unitary magnet 1 transversely with respect to a longitudinal axis of the unitary magnet 1 can be positioned in proximity to the at least one longitudinal extremity of the unitary magnet 1. There can be a transversal recessed shape 6a in proximity to each of the longitudinal extremities of the unitary magnet 1.

This positioning can be just on the longitudinal extremity when the unitary magnet 1 comprises only one first portion 1a as illustrated in FIG. 1c, or at the junction of the first portion 1a with the at least one second portion 1b, as shown in FIGS. 2c and 3c. A positioning in proximity to the at least one longitudinal extremity of the unitary magnet 1 covers both these positions and all intermediate positions.

Because a second portion 1b is essentially half as large as a first portion 1a or even smaller, "in proximity to the longitudinal extremity" means that the transverse recessed shapes 6a are comprised between a longitudinal extremity of the unitary magnet 1 and no farther than a point equidistant from the longitudinal extremity of the unitary magnet and the center of the length of the first portion 1a of the unitary magnet 1.

As illustrated in FIG. 1c, the first portion 1a forming the body of the unitary magnet 1 can be in the shape of a polygon with longitudinal facets 3. Alternatively, the first portion 1a of the unitary magnet 1 can also be in a cylindrical shape with a cylindrical or ovalized cross-section. In this case, it is possible to also provide the more or less perfect cylindrical shape with at least one longitudinal bevel 6 in the direction of its length and/or with at least one transverse bevel 6a on at least one of the longitudinal extremities of the unitary magnet 1.

Each bevel 6, 6a can have a varying depth along the length of the magnet. For a longitudinal bevel 6, this depth can be greater toward one longitudinal extremity or, on the other hand, greater in the longitudinal median portion of the unitary magnet 1.

As described above and illustrated in FIGS. 2c, 3c and 4c, the unitary magnet 1 can have at least one second portion 1b on a longitudinal extremity of the unitary magnet 1 as an extension of the first portion 1a. There can also be two second portions 1b with a second portion 1b respectively on one longitudinal extremity of the unitary magnet 1.

The second portion or portions 1b can point toward one associated longitudinal extremity of the magnet, with a decreasing cross-section approaching the longitudinal extremity.

As illustrated in FIG. 3c and in particular in FIG. 4c, the second longitudinal end portion or portions 1b can be rounded and have a convex shape. A crown of the convex shape of the second or each longitudinal end portion 1b forms the associated longitudinal extremity of the unitary magnet 1.

As illustrated in FIGS. 2c, 3c and 4c, the second longitudinal end portion or portions b can end on their associated longitudinal extremity in a median facet 5 forming the longitudinal extremity. In FIG. 4c, for the ovoid shape, however, this median facet 5 forming the longitudinal extremity is however rounded or is only optional.

As illustrated in FIGS. 2c and 3c, the second longitudinal end portions 1b can comprise lateral facets 4 inclined toward a longitudinal axis of the magnet 1 as it approaches the associated longitudinal extremity of the magnet.

These inclined lateral facets 4 can extend between a large base 4a connected to the first portion 1a forming the body of the magnet and a small base forming a longitudinal extremity of the magnet. A large base 4a of this type can have transverse recessed shapes 6a as an alternative to or in addition to the longitudinal recessed shapes 6 on the first portion 1a.

As shown in FIG. 3c, the inclined lateral facets can be rounded to make them convex.

As shown in FIGS. 2c and 3c, the inclined lateral facets 4 of the second portion or portions 1b can have the same width as the longitudinal facets of the first portion 1a, an inclined facet 4 being placed end to end with a respective longitudinal facet 3.

As shown more clearly in FIGS. 3c and 4c, each longitudinal extremity of the unitary magnet 1 can comprise a second longitudinal end portion 1b.

With reference in particular to FIGS. 1a and 1b, 2a and 2b, 3a and 3b, 4a and 4b and FIGS. 5 and 6, the invention relates to a magnet structure 2 in three dimensions constituted by a plurality of unitary magnets 1, each unitary magnet being of the type described above.

In this magnet structure 2, the unitary magnets 1 are directly adjacent to one another and are in partial contact on the level of the longitudinal shapes 6a recessed toward the interior. The unitary magnets 1 are fastened by the application of adhesive over at least a portion of the recessed shapes 6, 6a. The plurality of unitary magnets 1 creates a mesh structure of magnets without the interposition of retaining elements between them other than the adhesive, the unitary magnets 1 being in direct contact between adjacent magnets. This is visible particularly clearly in FIG. 5 and in the enlarged FIGS. 1b, 2b, 3b and 4b. The patterns formed by the unitary magnets 1 are different depending on the design of these unitary magnets 1.

When the recessed longitudinal shapes are longitudinal bevels on the unitary magnet 1 recessed into the external contour of the magnet on the first portion 1a of the unitary magnet 1, the application of the adhesive involves the bevels 6 of the unitary magnets 1.

When the large base 4a of each inclined facet is hollowed out at least partly by a transverse bevel 6a as a recessed shape on the one or two portions 1b, the adhesive is applied exclusively to the large base 4a of the unitary magnets 1 for the at least one second portion 1b. Of course, for a combination of longitudinal bevels 6 and transverse bevels 6a, both types of bevels, the longitudinal 6 and transverse 6a, are the only areas that receive an application of adhesive.

That means that only the longitudinal recessed shapes 6 and transverse recessed shapes 6a receive the adhesive, and therefore the adhesive connection is a spot connection and limited to the recessed shapes.

Figure 6:
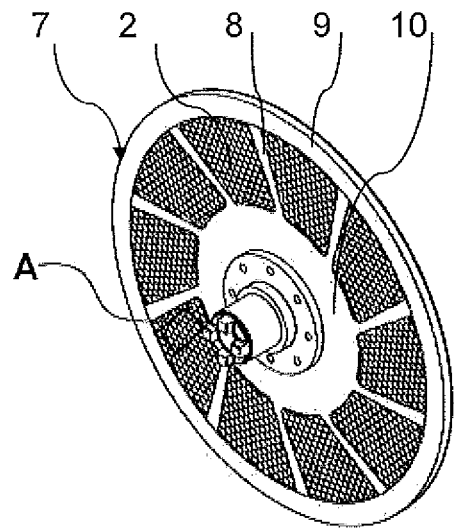
FIG. 6 is a schematic illustration of a view in perspective of a rotor comprising a plurality of magnet structures, the rotor being part of an electromagnetic actuator according to the present invention, the portion A inside the frame in this figure making reference to FIG. 5.

As illustrated in FIG. 6, the invention relates to a linear or rotary electromagnetic actuator comprising a unitary magnet structure 2 or a plurality of such magnet structures 2, the magnet structure or structures 2 being part of a rotor 7 that rotates around its center, the magnet structure or structures 2 being arranged concentrically around the center of the rotor 7.

The actuator illustrated in FIG. 6 is an axial flux actuator but can also be a radial flux actuator.

The magnet structure or structures 2 can be arranged concentrically around the center of the rotor 7, advantageously separated by branches 8 if there are a plurality of magnet structures 2 and framed on one hand by a hub 10 and a binding band 9. The branches begin at the hub 10 and end at the binding band 9.

When unitary, the magnet structure 2 can form a single magnet that extends over the actuator. When there are a plurality, as illustrated in FIG. 6, the magnet structures 2 are successive blocks forming successive alternating magnetic poles.

Finally, the invention relates to a method for the fabrication of a magnet structure 2 of the type described above. The method comprises a step of cutting out from a magnetized tile having a length, a width and a thickness forming the three dimensions of the tile, a plurality of unitary magnets 1 according to the three dimensions of the magnetized tile.

The method then comprises a step of determining areas of partial contact on each unitary magnet 1 with each magnet that is adjacent to it when the magnets are adjacent to one another. The partial contact areas depend on the external contour of the unitary magnets 1.

The next step in the method is the realization in the areas of contact of longitudinal shapes 6 and/or transverse shapes 6a recessed toward the interior of the unitary magnet 1 extending over at least a portion of a length of the first portion 1a and/or transverse to the first portion 1a, for example on the large base 4a of inclined facets 4 of the second portion 1b, when present.

The next step is the adhesive fastening of each unitary magnet 1 by depositing a resin on each unitary magnet 1 only in determined areas of partial contact. "Adhesive fastening" means the application or depositing of adhesive in this step of the method.

The unitary magnets 1 to which adhesive has been applied are then positioned adjacent to one another, partial contact between two adjacent unitary magnets 1 being established in the contact areas.

A layer of composite can be injected around the unitary magnets 1 thus placed in contact and adhesively fastened to one another to coat them and solidify the magnet structure 2 thus created.

The invention claimed is:

1. A magnet structure (2) in three dimensions comprising:
   a plurality of unitary magnets (1), the unitary magnets (1) being directly adjacent to one another, characterized in that:
   each unitary magnet (1) comprises a longitudinal first portion (1a) having an external contour with shapes (6) recessed toward the interior of the unitary magnet (1) extending over at least a part of a length of the first portion (1a) and/or recessed shapes (6a) extending over at least a portion of the periphery of the unitary magnet (1) transverse to a longitudinal axis of the unitary magnet (1) in proximity to at least one longitudinal extremity of the unitary magnet (1),
   the unitary magnets (1) being partly in contact with one another at the level of the shapes (6, 6a) recessed toward the interior,
   the magnets being adhesively connected to one another by the deposition of adhesive on at least a portion of the recessed shapes (6, 6a), the plurality of unitary magnets (1) creating a mesh structure of magnets without the interposition of retention elements between them other than the adhesive.

2. The magnet structure (2) according to claim 1, in which the recessed shapes (6, 6a) of the unitary magnets (1) are cavities or longitudinal bevels (6) and/or transverse bevels (6a) on each unitary magnet (1) hollowed into the external contour of the first portion (1a) of the unitary magnet (1).

3. The magnet structure (2) according to claim 1, in which the first portion (1a) and the longitudinal bevels (6) of the unitary magnets (1) extend over an entire length of each unitary magnet (1).

4. The magnet structure (2) according to claim 1, in which the first portion (1a) forming the body of each unitary magnet (1) is in the shape of a polygon with longitudinal facets (3) or in the shape of a cylinder with a circular or ovalized cross section.

5. The magnet structure (2) according to claim 4, in which, when the first portion (1a) is in the shape of a polygon with longitudinal facets (3), each longitudinal bevel (6) separates two longitudinal facets (3) of the first portion (1a).

6. The magnet structure (2) according to claim 2, in which each longitudinal bevel (6) has a depth that varies over the length of each unitary magnet (1).

7. The magnet structure (2) according to claim 1, in which each unitary magnet (1) has at least one second portion (1b) on one longitudinal extremity of the unitary magnets (1) extending the first portion (1a), the at least one second portion (1b) pointing toward an associated longitudinal extremity of the magnet having a decreasing cross-section as it approaches the longitudinal extremity.

8. The magnet structure (2) according to claim 7, in which each unitary magnet (1) has an at least partly ovoid exterior contour with the first portion (1a) forming the body of the unitary magnets (1) having a larger cross-section and extending over a greater length of the unitary magnet (1) than the at least one second portion (1b).

9. The magnet structure (2) according to claim 8, in which the at least one second longitudinal end portion (1b) of each unitary magnet (1) is rounded giving it a convex shape, a crown of the convex shape of the second longitudinal end portion (1b) forming the associated longitudinal extremity of the unitary magnet (1).

10. The magnet structure (2) according to claim 9, in which the at least one second longitudinal end portion (1b) of each unitary magnet (1) is terminated at its associated longitudinal extremity by a median facet (5) forming a longitudinal extremity.

11. The magnet structure (2) according to claim 7, in which the at least one second longitudinal end portion (1b) of each unitary magnet (1) comprises lateral facets (4) inclined toward a longitudinal axis of the magnet as it approaches the associated longitudinal extremity of the unitary magnet (1), the inclined lateral facets (4) extending between a large base (4a) connected to the first portion (1a) forming the body of the magnet and a small base forming a longitudinal extremity of the unitary magnet (1).

12. The magnet structure (2) according to claim 11, in which the inclined lateral facets (4) of each unitary magnet (1) are rounded to be convex.

13. The magnet structure (2) according to claim 5, in which the inclined lateral facets (4) of the at least one second portion (1b) of each unitary magnet (1) have the same width as the longitudinal facets of the first portion (1a), an inclined facet (4) being placed and to end with a respective longitudinal facet (3).

14. The magnet structure (2) according to claim 11, in which the large base (4a) of each inclined facet is hollowed out at least partly by a transverse bevel (6k) in the form of a recessed shape.

15. The magnet structure (2) according to claim 14, in which each longitudinal extremity of each unitary magnet (1) comprises a second longitudinal end portion (1b).

16. The magnet structure (2) according to claim 15, when the longitudinal and/or transverse recessed shapes are longitudinal bevels (6) and/or transverse bevels (6a) on the unitary magnet (1) hollowed into the external contour of the unitary magnet (1), the application of adhesive relates exclusively to the bevels (6, 6a) of the unitary magnets (1).

17. The magnet structure (2) according to claim 16 in which, the large base (4a) of each inclined facet being at least partly hollowed out by a transverse bevel (6a) as a transverse recessed shape on the at least one second portion (1b), the application of adhesive relates exclusively to the large base (4a) of the unitary magnets (1) for the at least one second portion (1b).

18. A linear or rotary electromagnetic actuator, characterized in that it comprises a magnet structure (2) or a plurality of magnet structures (2) according to claim 1, the magnet structure or structures (2) being part of a rotor (7) that rotates around its center, the magnet structure or structures (2) being arranged concentrically with respect to the center of the rotor (7).

19. An electromagnetic actuator according to claim 18, in which, when unitary, the magnet structure (2) forms a single magnet extending over the actuator or, when there are a plurality, the magnet structures (2) are successive blocks forming successive alternating magnetic poles.

20. A method for the fabrication of a magnet structure (2) according to claim 1, characterized in that it comprises the following steps:
  cutting out from a magnetized tile having a length, a width and a thickness forming three dimensions of the tile a plurality of unitary magnets (1) according to the three dimensions of the magnetized tile,
  determination of partial contact areas on each unitary magnet (1) with each magnet that is adjacent to it when the magnets are arranged next to one another,
  creation in the areas of contact of shapes (6, 6a) recessed toward the interior of the unitary magnet (1) extending over at least part of the length of the first portion (1a) and/or transverse to the first portion, (1a)
  adhesive connection of each unitary magnet (1) by the application of a resin for each unitary magnet (1) only in determined partial contact areas,
  positioning of the unitary magnets (1) thus adhesively connected adjacent to one another, a partial contact between two adjacent unitary magnets (1) being established in the contact areas.

21. The method according to claim 20 in which there is an injection of a layer of composite around the unitary magnets (1) which are thereby placed into contact and adhesively connected for their coating.

* * * * *